(12) United States Patent
Sun et al.

(10) Patent No.: US 11,586,616 B2
(45) Date of Patent: Feb. 21, 2023

(54) AUTOMATICALLY UPDATING COLUMN DATA TYPE

(71) Applicant: INTERNATIONAL BUSINESS MACHINES CORPORATION, Armonk, NY (US)

(72) Inventors: Sheng Yan Sun, Beijing (CN); Shuo Li, Beijing (CN); Xiaobo Wang, Beijing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 17/248,528

(22) Filed: Jan. 28, 2021

(65) Prior Publication Data

US 2022/0237178 A1    Jul. 28, 2022

(51) Int. Cl.
*G06F 16/23* (2019.01)
*G06F 16/22* (2019.01)

(52) U.S. Cl.
CPC ........ *G06F 16/2379* (2019.01); *G06F 16/221* (2019.01)

(58) Field of Classification Search
CPC ..... G06F 16/2379; G06F 16/221; G06F 16/23
See application file for complete search history.

(56) References Cited

U.S. PATENT DOCUMENTS

| 10,445,170 | B1 | 10/2019 | Subramanian |
| 10,545,984 | B2 | 1/2020 | Zhang |
| 2016/0147776 | A1* | 5/2016 | Florendo ............... G06F 16/221 707/694 |
| 2018/0150490 | A1 | 5/2018 | Lipcon |
| 2020/0097571 | A1 | 3/2020 | Mathur |
| 2020/0167522 | A1 | 5/2020 | Cervelli |

\* cited by examiner

*Primary Examiner* — Robert W Beausoliel, Jr.
*Assistant Examiner* — Mohammad S Bhuyan
(74) *Attorney, Agent, or Firm* — Schmeiser, Olsen & Watts; Stephanie Carusillo

(57) ABSTRACT

An approach is provided for automatically updating a data type of a database column. Based on a database definition, category, and usage, the column is determined to be a candidate for a data type change. For first values in the column values, costs of processing queries using a new data type are determined to be less than other costs of processing the queries using other data types. For exception value(s) in the column values, costs of processing the queries using the original data type are determined to be less than other costs of processing the queries using other data types. The original data type is replaced with the new data type for the first values and the original data type is retained for the exception value(s). The first values are associated with a first schema and the exception value(s) are associated with a second schema.

20 Claims, 4 Drawing Sheets

| C1 | C2 | C3 | C4 | ... | Cn | Schema |
|---|---|---|---|---|---|---|
|  |  | 302 |  |  |  | 2 |
|  |  | 304 |  |  |  | 2 |
|  |  | 306 |  |  |  | 2 |
|  |  | 308 |  |  |  | 2 |
|  |  | Exception value 310 |  |  |  | 1 |
|  |  | Exception value 312 |  |  |  | 1 |

AUTOMATICALLY UPDATING COLUMN DATA TYPE

BACKGROUND

The present invention relates to designing a database, and more particularly to updating a data type of a database column.

Database design includes organizing data according to a database model. A database design determines what data must be stored and how data elements interrelate. With SQL and NoSQL database development and with an increasing number of people working in application development on cloud databases, current approaches to database design attempt to address how to design a business database for application usage.

SUMMARY

In one embodiment, the present invention provides a computer-implemented method. The method includes determining, by one or more processors, a database definition, a database category, and a usage of a column of a table of a database. The method further includes based on the database definition, the database category, and the usage, determining, by the one or more processors, that the column is a candidate for changing an original data type of the column. The method further includes determining, by the one or more processors, multiple costs of processing queries in a workload using multiple data types for multiple values in the column. The multiple data types include the original data type and a new data type. The method further includes determining, by the one or more processors, that for first values included in the multiple values, first costs of processing the queries using the new data type are less than first other costs that are included in the multiple costs and are associated with the first values. The method further includes determining, by the one or more processors, that for one or more exception values included in the multiple values and that are not included in the first values, second costs of processing the queries using the original data type are less than second other costs that are included in the multiple costs and are associated with the one or more exception values. The method further includes altering, by the one or more processors, the table by replacing the original data type with the new data type for the first values in the column, and retaining the original data type for the one or more exception values. The method further includes associating, by the one or more processors, the first values with a first schema and associating the one or more exception values with a second schema. The first schema indicates the new data type and the second schema indicates the original data type.

A computer program product and a computer system corresponding to the above-summarized method are also described and claimed herein.

BRIEF DESCRIPTION OF THE DRAWINGS

FIG. 3 is an example of a database table that is altered using the process of FIG. 2, in accordance with embodiments of the present invention.

DETAILED DESCRIPTION

Overview

Existing database design approaches may be used by people who have little or no experience in database definition and who lack a detailed business logic design. When the aforementioned people design a database, they often use a broad data type in a database table definition, rather than a precise one. Using the broader data type causes the database size to be larger than necessary and may also cause a decrease in database performance. For example, an inexperienced person designing a database may insert a date and time column into a database table and select varchar(18) as the data type of the column (i.e., a column with a size of 18 bytes) instead of a built-in timestamp data type whose size is 7 bytes. The inexperienced person's selection of varchar (18) may be based only on the person's knowledge of the application being developed or the person having a familiarity with using the varchar(18) data type. In this example, had the person selected the built-in timestamp data type, database size and database performance would have been optimized. For instance, using varchar(18) instead of the built-in timestamp data type may cause a query to inefficiently search through more database pages. The varchar (18) data type requires a larger size than the built-in timestamp data type to store each date and time value, thereby causing fewer database rows to be contained on each database page as compared to the built-in timestamp data type. Because each page contains fewer rows with the varchar(18) data type as compared to the built-in timestamp data type, a given search using the conventional approach may require searching through a greater number of pages.

Embodiments of the present invention address the aforementioned unique challenges of the traditional database design approaches by using automatic analytics to determine an original data type of a database column in a database table is unsuitable, determine a new, suitable data type for the database column, and alter the database table by replacing the original data type with the new data type. In one embodiment, particular exception data for the database column is identified and the exception data is kept in its original data type within a new schema that includes the database table altered to include the new data type.

Embodiments of the present invention make it easy for a database end user to define a database or a database object for usage. Embodiments of the present invention provide a system for updating column data types that is application-transparent and compatible within migration and maintenance. Embodiments of the present invention retain the database size that was used for the initial database, thereby optimizing storage while providing new and attractive revenue options.

System for Automatically Updating a Data Type of a Database Column

Figure 1:
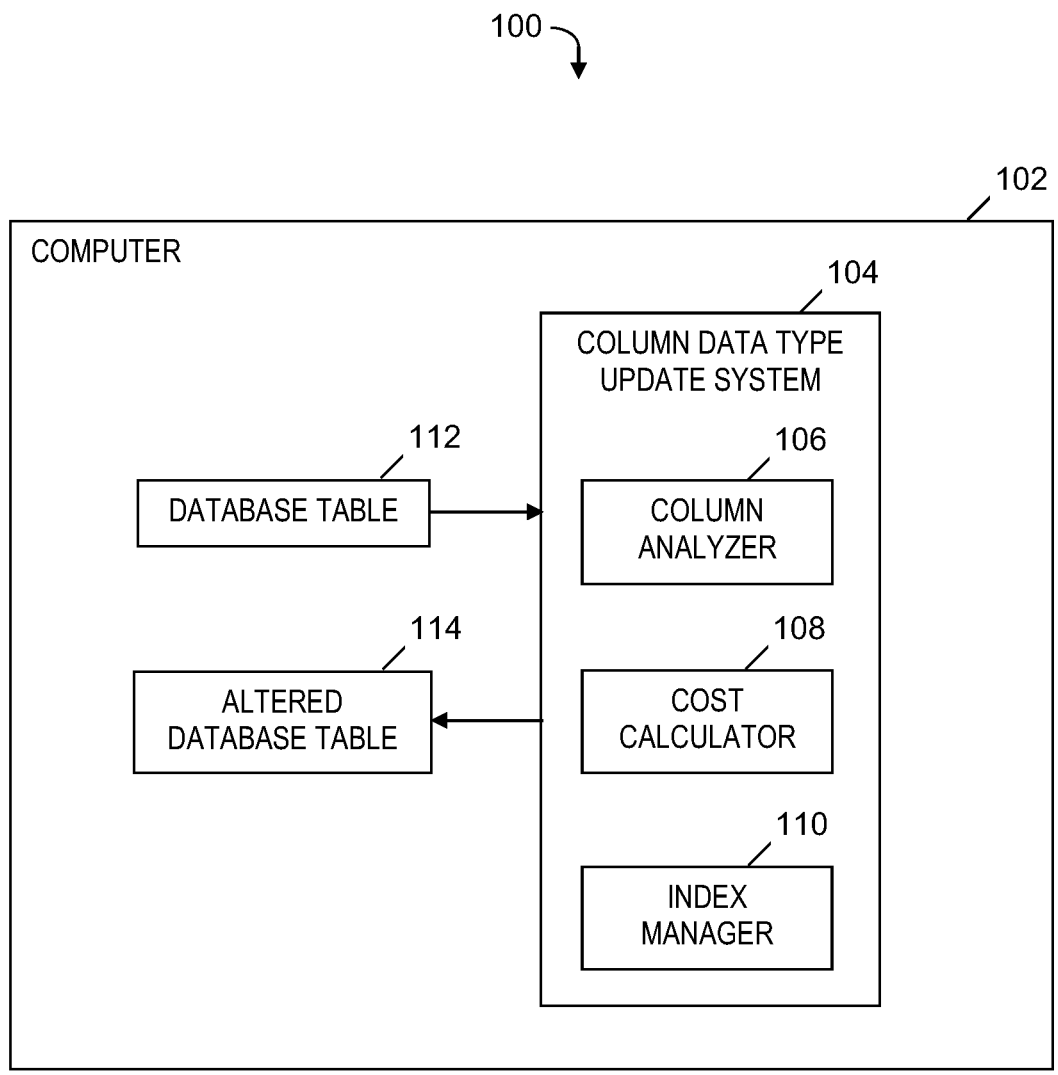
FIG. 1 is a block diagram of a system for automatically updating a data type of a database column, in accordance with embodiments of the present invention.

FIG. 1 is a block diagram of a system 100 for automatically updating a data type of a database column, in accordance with embodiments of the present invention. System 100 includes a computer 102 that includes a software-based column data type update system 104, which includes a column analyzer 106, a cost calculator 108, and an index manager 110.

Column data type update system 104 receives a database table 112, which includes multiple columns of values. Column analyzer 106 analyzes a database definition, a database category, and a business usage of a given column in database table 112 to determine whether the given column is a candidate for updating an original data type of the column. Cost calculator 108 determines access paths and calculates costs of processing a workload query using different data types that can replace the original data type of the column. Based on a minimum cost among the costs that is less than a cost of processing the workload query using the original data type, cost calculator 108 finds a new data type as a suitable data type to replace the original data type for at least some of the values in the column. Cost calculator 108 determines whether the column includes one or more exception values in the column (i.e., values for which the cost of processing workload query using the original data type is less than the other calculated costs associated with the other data types).

Column data type update system 104 automatically alters database table 112 to an altered database table 114 in which the original data type is updated to the new data type found by cost calculator 108 for the values in the column other than the one or more exception values. The one or more exception values in the column in altered database table 114 retain their original data type without an update. In response to the update of the original data type to the new data type, index manager 110 automatically builds an index for the values in the column.

In one embodiment, column data type update system 104 performs updates of data types of other columns in database table 112 and other database tables (not shown) to allow query executions that access values in the database tables to access pages that include more rows than if the database tables had retained the original data type for all the values in the database tables (i.e., more rows than if the database tables had not been updated by column data type update system 104), thereby allowing for more efficient searches of the database tables because there are fewer pages to load and search through. Compared to conventional approaches, the update of the column data types by column data type update system 104 allows for similar gains in search efficiency for pages, segments, and partitions.

Figure 2:
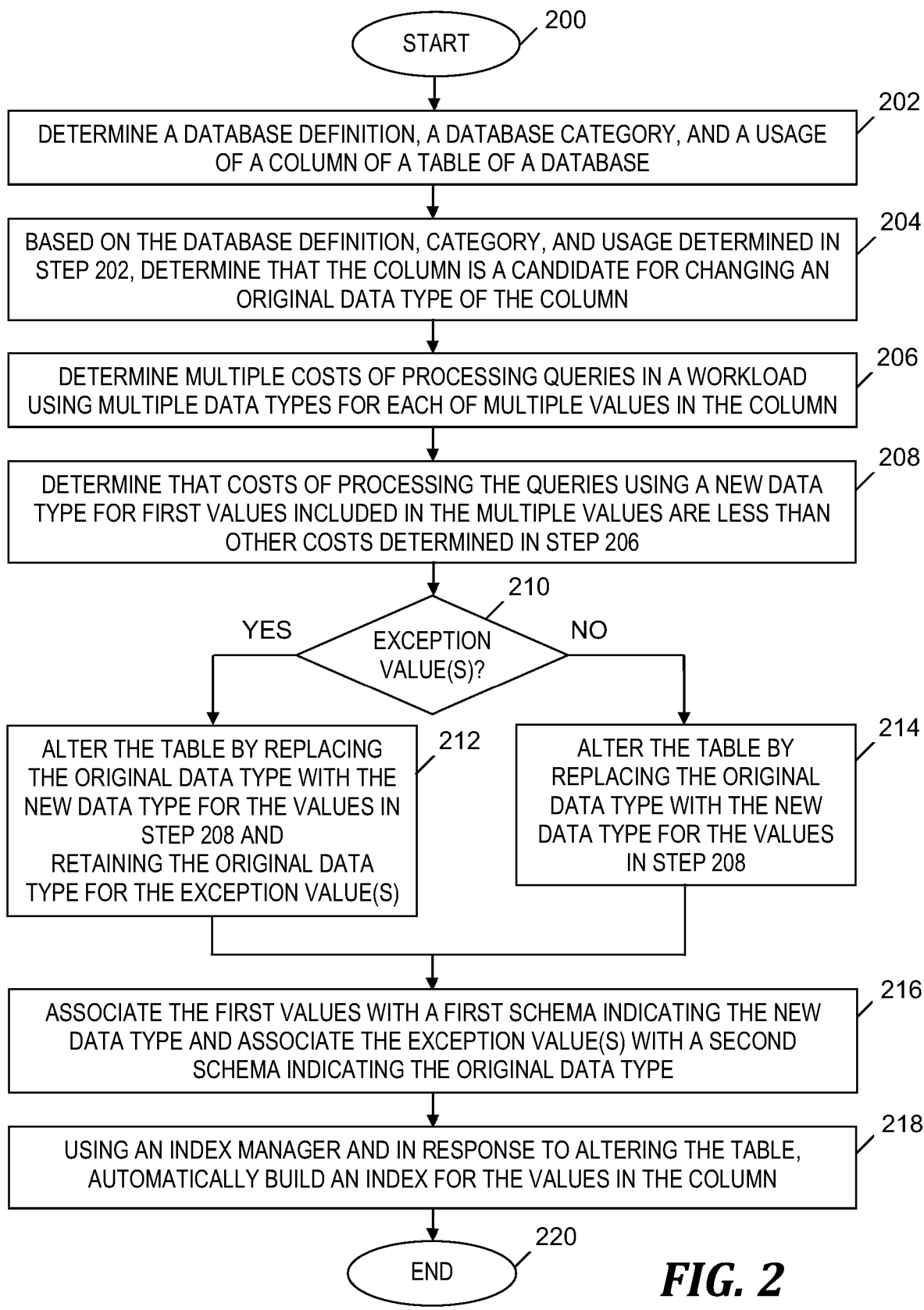
FIG. 2 is a flowchart of a process of automatically updating a data type of a database column, where the process is implemented in the system of FIG. 1, in accordance with embodiments of the present invention.
Figure 4:
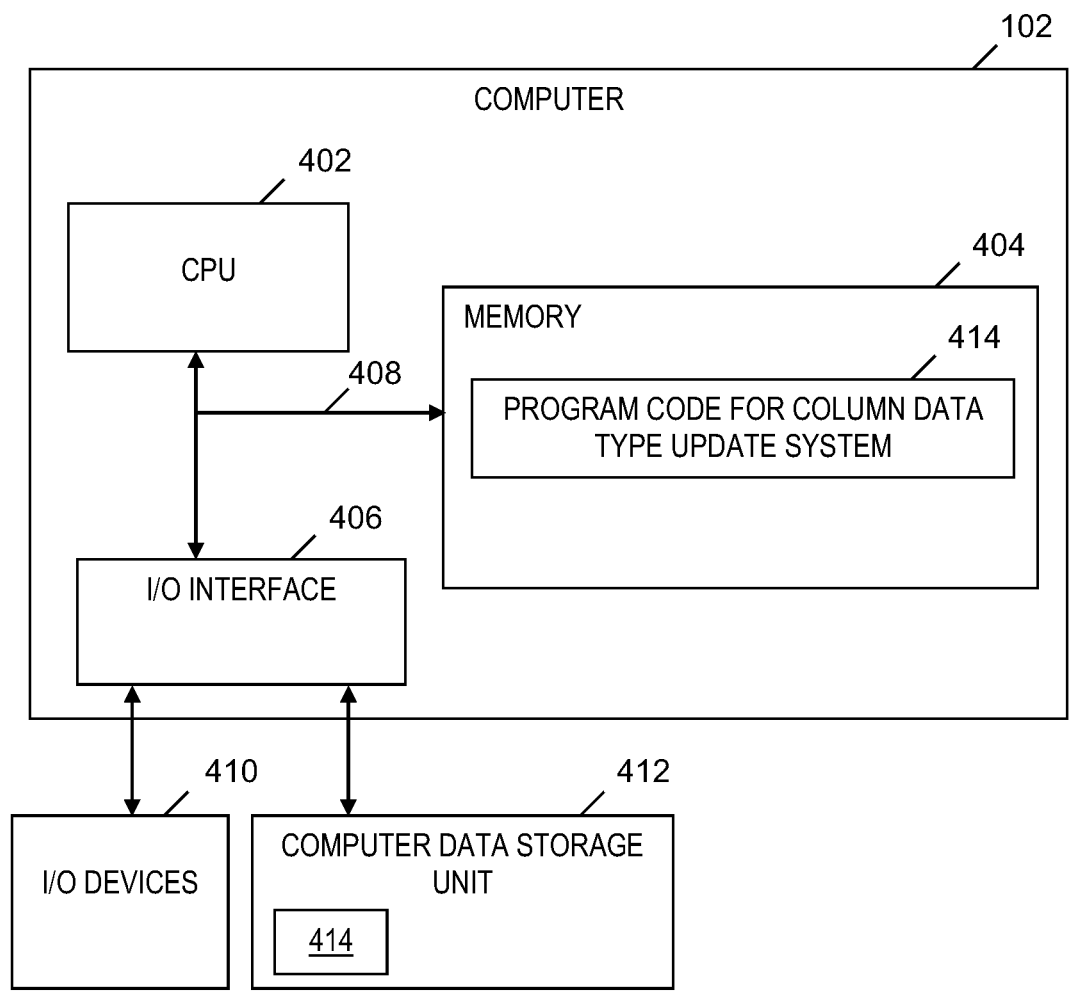
FIG. 4 is a block diagram of a computer that is included in the system of FIG. 1 and that implements the process of FIG. 2, in accordance with embodiments of the present invention.

The functionality of the components shown in FIG. 1 is described in more detail in the discussion of FIG. 2, FIG. 3, and FIG. 4 presented below.

Process for Automatically Updating a Data Type of a Database Column

FIG. 2 is a flowchart of a process of automatically updating a data type of a database column, where the process is implemented in the system of FIG. 1, in accordance with embodiments of the present invention. The process of FIG. 2 begins at a start node 200. In step 202, column data type update system 104 (see FIG. 1) determines a database definition, a database category, and a business usage of a column of a table of a database. Hereinafter, in the discussion of FIG. 2, the aforementioned column of the table of the database is simply referred to as "the column." In one embodiment, column analyzer 106 (see FIG. 1) performs step 202.

In step 204, based on the database definition, category, and usage determined in step 202, column data type update system 104 (see FIG. 1) determines that the column is a candidate for changing an original data type of the column to a different data type. In one embodiment, column analyzer 106 (see FIG. 1) performs step 204.

In one embodiment, step 204 includes: (1) determining that a given column included in database table 112 (see FIG. 1) is an identifier column, an auto-increment column, or a sequence column; (2) filtering out the given column from remaining one or more columns included in the multiple columns in database table 112 (see FIG. 1); (3) repeating the steps (1) and (2) in this paragraph until each of the remaining one or more columns is not an identifier column, an auto-increment column, or a sequence column; and (4) after step (3) is completed, selecting the column from the remaining one or more columns, where the selected column is the candidate for changing the original data type of the column to a different data type.

Step 204 determines a candidate column for changing an original data type to a new data type automatically, without a customer input or configuration. In one embodiment, the change to a new data type is based on business usage, without being based on data length.

In step 206, column data type update system 104 (see FIG. 1) determines multiple costs of processing queries in a workload using multiple data types for each value of multiple values in the column. In one embodiment, cost calculator 108 (see FIG. 1) performs step 206.

In one embodiment, step 206 includes (1) identifying a portion of data in the column that has null values; (2) sampling data sizes of the data in the column, but not sampling the portion of data that was identified as having null values; and (3) using defined policies associating a given sampled data size to a corresponding data type, identifying the aforementioned multiple data types referenced in the discussion of step 206 as data types corresponding to the sampled data sizes. In one embodiment, determining the multiple costs in step 206 is based on the identified multiple data types. The aforementioned policies associating a data size to a data type may use a data type tree inputted into the column data type update system 104 (see FIG. 1).

In one embodiment, step 206 includes (1) selecting a given data type from the multiple data types; (2) selecting a query for the workload; (3) determining an access path to execute the selected query for the given data type; (4) determining a cost of executing the selected query using the access path; (5) determining other costs of executing the selected query using other access paths; (6) determining that the cost of executing the selected query is less than the other costs of executing the selected query; and (7) based on the cost being less than the other costs of executing the selected query, selecting the given data type as the new data type.

In another embodiment, step 206 includes (1) selecting a given data type from the multiple data types; (2) selecting a query for the workload; (3) determining an access path to execute the selected query for the given data type; (4) determining a cost of executing the selected query using the access path; (5) determining other costs of executing the selected query using other access paths; (6) determining that the cost of executing the selected query is equal to the other costs of executing the selected query or differs from the other costs of executing the selected query by an amount less than a threshold amount; (7) in response to the cost being equal to the other costs or differing from the other costs by the amount less than the threshold amount, determining the page size associated with the access path and other page sizes associated with the other access paths; (8) determining that the page size associated with the access path is less than the other page sizes; and (9) based on the page size associated with the access path being less than the other page sizes, selecting the given data type as the new data type.

Step 206 may also include the column data type update system 104 (see FIG. 1) (i) determining table statistics and index statistics for a given access path for a nested loop join, a hybrid join, and a sort merge join, and (ii) based on the table statistics and the index statistics, selecting the given access path as the access path which is used by the query selected in step (2) in either of the embodiments described in the previous two paragraphs. The table statistics include the number of rows in a partition or table, the number of active pages for table space, the number of pages in which rows appear in a partition or table, and the percentage of compressed rows. The index statistics include the number of active leaf pages, the number of levels in the index tree, and the percentage of data rows in clustering order.

In one embodiment, the determination of costs in step 206 includes an analysis of a query which includes an analysis of the access method (i.e., determining how data is retrieved from tables), predicate application (i.e., determining, at runtime, when predicates are applied), joins (i.e., determining which join sequence and which join method is the best for query performance), and sorting (i.e., determining whether sorting is required or whether sorting can be avoided).

In step 208, column data type update system 104 (see FIG. 1) determines that costs (as determined in step 206) of processing the queries in the workload using a particular data type for first values included in the aforementioned multiple values are less than any of the other costs (as determined in step 206) of processing the queries using other data types for the first values. The particular data type referenced in the discussion of step 208 is also referred to herein as the "new data type."

In step 210, column data type update system 104 (see FIG. 1) determines whether there are exception value(s) among the values in the column by determining whether a cost of processing the queries using the original data type of one or more values in the column is less than or equal to any of the other costs of processing the queries using other data types for the one or more values, as determined in step 206. If column data type update system 104 (see FIG. 1) determines in step 210 that there are exception value(s) in the values in the column by determining that one or more costs of processing the queries using the original data type of one or more given values is less than or equal to any of the other costs using other data types for the one or more values, as determined in step 206, then the Yes branch of step 210 is taken and step 212 is performed.

In step 212, column data type update system 104 (see FIG. 1) alters the table that includes the column by replacing the original data type with the new data type for the first values referenced in step 208 and retaining the original data type for the exception value(s) determined in step 210.

Returning to step 210, if column data type update system 104 (see FIG. 1) determines that there are no exception value(s) in the values in the column (i.e., by determining that there is not a cost of processing the queries using the original data type of a given value that is less than or equal to any of the other costs using other data types for the given value), then the No branch of step 210 is taken and step 214 is performed.

In step 214, column data type update system 104 (see FIG. 1) alters the table that includes the column by replacing the original data type with the new data type for the multiple values in the column.

In step 216, which follows step 212 and step 214, column data type update system 104 (see FIG. 1) associates the first values referenced in step 208 with a first schema indicating the new data type. In step 216, if there are any exception value(s) determined in step 210, column data type update system 104 (see FIG. 1) associates the exception value(s) with a second schema that indicates the original data type.

In step 218, in response to altering the table in step 212 or step 214 and using index manager 110 (see FIG. 1), column data type update system 104 (see FIG. 1) automatically builds an index for the values in the column. Index manager 110 (see FIG. 1) builds an index for available column data with each data type. Each index built by index manager 110 (see FIG. 1) keeps the original index functions. For select cross index for a different data type, the output data merge avoids sorting.

Following step 218, the process of FIG. 2 finishes at an end node 220.

Example

FIG. 3 is a table 300, which is an example of a database table that is altered using the process of FIG. 2, in accordance with embodiments of the present invention. Table 300 has n columns of data values: C1, C2, C3, C4, Cn and a column labeled "Schema," which includes positive integer values that indicate schemas (i.e., versions) associated with respective data types. Column C3 in table 300 includes values 302, 304, 306, and 308 that are associated with the costs that are determined in step 208 (see FIG. 2) to be less than the other costs determined in step 206 (see FIG. 2). Column C3 also includes exception values 310 and 312 determined in step 210 (see FIG. 2). In step 212 (see FIG. 2), column data type update system 104 (see FIG. 1) alters table 300 by replacing the original data type of values 302, 304, 306, and 308 with a new data type referenced in step 208 (see FIG. 2). Step 212 (see FIG. 2) also includes column data type update system 104 (see FIG. 1) retaining the original data type for exception values 310 and 312, without any update to the new data type. In step 216 (see FIG. 2), column data type update system 104 (see FIG. 1) associates value 302, 304, 306, and 308 with one schema by inserting the value "2" into the Schema column for the rows in table 300 that include values 302, 304, 306, and 308, where the "2" in the Schema column indicates the new data type associated with values 302, 304, 306, and 308. Step 216 (see FIG. 2) also includes column data type update system 104 (see FIG. 1) associating exception values 310 and 312 with another schema by inserting the value "1" into the Schema column for the rows in table 300 that include exception values 310 and 312, where the "1" in the Schema column indicates the original data type associated with exception values 310 and 312.

Computer System

FIG. 4 is a block diagram of a computer that is included in the system of FIG. 1 and that implements the process of FIG. 2, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for column data type update system 104 (see FIG. 1) to perform a method of automatically updating a data type of a database column, where the instructions are executed by CPU 402 via memory 404. CPU 402 may include a single processing unit or processor or be distributed across one or more processing units or one or more processors in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems or a plurality of computer readable storage media in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes one or more known computer readable storage media, where a computer readable storage medium is described below. In one embodiment, computer data storage unit 412 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 404 and/or storage unit 412 may store computer program code 414 that includes instructions that are executed by CPU 402 via memory 404 to automatically update a data type of a database column. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

In one embodiment, computer data storage unit 412 includes a data repository (not shown in FIG. 1) and is operatively coupled to column data type update system 104 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to automatically updating a data type of a database column. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to automatically update a data type of a database column. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of automatically updating a data type of a database column.

While it is understood that program code 414 for automatically updating a data type of a database column may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider can offer to create, maintain, support, etc. a process of automatically updating a data type of a database column. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method comprising:
   determining, by one or more processors, a database definition, a database category, and a usage of a column of a table of a database;
   based on the database definition, the database category, and the usage, determining, by the one or more processors, that the column is a candidate for changing an original data type of the column;
   determining, by the one or more processors, multiple costs of processing queries in a workload using multiple data types for multiple values in the column, the multiple data types including the original data type and a new data type;
   determining, by the one or more processors, that for first values included in the multiple values, first costs of processing the queries using the new data type are less than first other costs that are included in the multiple costs and are associated with the first values;
   determining, by the one or more processors, that for one or more exception values included in the multiple values and that are not included in the first values, second costs of processing the queries using the original data type are less than second other costs that are included in the multiple costs and are associated with the one or more exception values;
   altering, by the one or more processors, the table by replacing the original data type with the new data type for the first values in the column, and retaining the original data type for the one or more exception values; and
   associating, by the one or more processors, the first values with a first schema and associating the one or more exception values with a second schema, the first schema indicating the new data type and the second schema indicating the original data type.

2. The method of claim 1, further comprising in response to the altering the table, automatically building, by the one or more processors and using an index manager, an index for the first values and the one or more exception values in the column.

3. The method of claim 1, further comprising:
   determining, by the one or more processors, that a given column included in multiple columns in the table is an identifier column, an auto-increment column, or a sequence column;
   filtering out, by the one or more processors, the given column from remaining one or more columns included in the multiple columns;
   repeating, by the one or more processors, the determining that the given column is the identifier, auto-increment, or sequence column and the filtering out the given column until each of the remaining one or more columns is not the identifier column, the auto-increment column, or the sequence column; and
   subsequent to the repeating, selecting, by the one or more processors, the column from the remaining one or more columns,
   wherein the determining that the column is the candidate for changing the original data type of the column is based on the column being selected from the remaining one or more columns.

4. The method of claim 3, further comprising:
   identifying, by the one or more processors, a portion of data in the column that is null;
   sampling, by the one or more processors, data sizes of the data in the column without considering the identified portion of the data that is null; and
   using defined policies associating a given sampled data size to a corresponding data type, identifying, by the one or more processors, the multiple data types as data types corresponding to the sampled data sizes, wherein the determining the multiple costs is based on the identified multiple data types.

5. The method of claim 1, wherein the determining the multiple costs of processing the queries in the workload includes:
   selecting a given data type from the multiple data types;
   selecting a query for the workload;
   determining an access path to execute the selected query for the given data type;
   determining a cost of executing the selected query using the access path;
   determining other costs of executing the selected query using other access paths;
   determining the cost of executing the selected query is less than the other costs of executing the selected query; and
   based on the cost being less than the other costs of executing the selected query, selecting the given data type as the new data type.

6. The method of claim 1, wherein the determining the multiple costs of processing the queries in the workload includes:
   selecting a given data type from the multiple data types;
   selecting a query for the workload;
   determining an access path to execute the selected query for the given data type;
   determining a cost of executing the selected query using the access path;
   determining other costs of executing the selected query using other access paths;
   determining the cost of executing the selected query is equal to the other costs of executing the selected query;
   in response to the determining the cost is equal to the other costs of executing the selected query, determining the page size associated with the access path and other page sizes associated with the other access paths;
   determining that the page size associated with the access path is less than the other page sizes; and
   based on the page size associated with the access path being less than the other page sizes, selecting the given data type as the new data type.

7. The method of claim 6, further comprising:
   determining, by the one or more processors, table statistics and index statistics for a given access path for a nested loop join, a hybrid join, and a sort merge join; and
   based on the table statistics and the index statistics, selecting the given access path as the access path which is used by the selected query.

8. The method of claim 1, further comprising:
   providing at least one support service for at least one of creating, integrating, hosting, maintaining, and deploying computer readable program code in the computer, the program code being executed by a processor of the computer to implement the determining the database definition, the database category, and the usage of the column, the determining that the column is the candidate, the determining the multiple costs of processing the queries in the workload using the multiple data types, the determining that for the first values included in the multiple values, the first costs of processing the queries using the new data type is less than the first other costs, the determining that for the one or more exception values the second costs of processing the queries using the original data type is less than the second other costs, the altering the table, and the associating the first values with the first schema and associating the one or more exception values with the second schema.

9. A computer program product for automatically updating a data type of a database column, the computer program product comprising:

one or more non-transitory computer readable storage media having computer readable program code collectively stored on the one or more non-transitory computer readable storage media, the computer readable program code being executed by a central processing unit (CPU) of a computer system to cause the computer system to perform a method comprising:

the computer system determining a database definition, a database category, and a usage of a column of a table of a database;

based on the database definition, the database category, and the usage, the computer system determining that the column is a candidate for changing an original data type of the column;

the computer system determining multiple costs of processing queries in a workload using multiple data types for multiple values in the column, the multiple data types including the original data type and a new data type;

the computer system determining that for first values included in the multiple values, first costs of processing the queries using the new data type are less than first other costs that are included in the multiple costs and are associated with the first values;

the computer system determining that for one or more exception values included in the multiple values and that are not included in the first values, second costs of processing the queries using the original data type are less than second other costs that are included in the multiple costs and are associated with the one or more exception values;

the computer system altering the table by replacing the original data type with the new data type for the first values in the column, and retaining the original data type for the one or more exception values; and the computer system associating the first values with a first schema and associating the one or more exception values with a second schema, the first schema indicating the new data type and the second schema indicating the original data type.

10. The computer program product of claim 9, wherein the method further comprises in response to the altering the table and using an index manager, the computer system automatically building an index for the first values and the one or more exception values in the column.

11. The computer program product of claim 9, wherein the method further comprises:

the computer system determining that a given column included in multiple columns in the table is an identifier column, an auto-increment column, or a sequence column;

the computer system filtering out the given column from remaining one or more columns included in the multiple columns;

the computer system repeating the determining that the given column is the identifier, auto-increment, or sequence column and the filtering out the given column until each of the remaining one or more columns is not the identifier column, the auto-increment column, or the sequence column; and subsequent to the repeating, the computer system selecting the column from the remaining one or more columns, wherein the determining that the column is the candidate for changing the original data type of the column is based on the column being selected from the remaining one or more columns.

12. The computer program product of claim 11, wherein the method further comprises:

the computer system identifying a portion of data in the column that is null;

the computer system sampling data sizes of the data in the column without considering the identified portion of the data that is null; and using defined policies associating a given sampled data size to a corresponding data type, the computer system identifying the multiple data types as data types corresponding to the sampled data sizes, wherein the determining the multiple costs is based on the identified multiple data types.

13. The computer program product of claim 9, wherein the determining the multiple costs of processing the queries in the workload includes:

selecting a given data type from the multiple data types;

selecting a query for the workload;

determining an access path to execute the selected query for the given data type;

determining a cost of executing the selected query using the access path;

determining other costs of executing the selected query using other access paths;

determining the cost of executing the selected query is less than the other costs of executing the selected query; and based on the cost being less than the other costs of executing the selected query, selecting the given data type as the new data type.

14. The computer program product of claim 9, wherein the determining the multiple costs of processing the queries in the workload includes:

selecting a given data type from the multiple data types;

selecting a query for the workload;

determining an access path to execute the selected query for the given data type;

determining a cost of executing the selected query using the access path;

determining other costs of executing the selected query using other access paths;

determining the cost of executing the selected query is equal to the other costs of executing the selected query;

in response to the determining the cost is equal to the other costs of executing the selected query, determining the page size associated with the access path and other page sizes associated with the other access paths;

determining that the page size associated with the access path is less than the other page sizes; and based on the page size associated with the access path being less than the other page sizes, selecting the given data type as the new data type.

15. A computer system comprising:

a central processing unit (CPU);

a memory coupled to the CPU; and
one or more computer readable storage media coupled to the CPU, the one or more computer readable storage media collectively containing instructions that are executed by the CPU via the memory to implement a method of automatically updating a data type of a database column, the method comprising:
the computer system determining a database definition, a database category, and a usage of a column of a table of a database;
based on the database definition, the database category, and the usage, the computer system determining that the column is a candidate for changing an original data type of the column;
the computer system determining multiple costs of processing queries in a workload using multiple data types for multiple values in the column, the multiple data types including the original data type and a new data type;
the computer system determining that for first values included in the multiple values, first costs of processing the queries using the new data type are less than first other costs that are included in the multiple costs and are associated with the first values;
the computer system determining that for one or more exception values included in the multiple values and that are not included in the first values, second costs of processing the queries using the original data type are less than second other costs that are included in the multiple costs and are associated with the one or more exception values;
the computer system altering the table by replacing the original data type with the new data type for the first values in the column, and retaining the original data type for the one or more exception values; and
the computer system associating the first values with a first schema and associating the one or more exception values with a second schema, the first schema indicating the new data type and the second schema indicating the original data type.

16. The computer system of claim 15, wherein the method further comprises in response to the altering the table and using an index manager, the computer system automatically building an index for the first values and the one or more exception values in the column.

17. The computer system of claim 15, wherein the method further comprises:
the computer system determining that a given column included in multiple columns in the table is an identifier column, an auto-increment column, or a sequence column;
the computer system filtering out the given column from remaining one or more columns included in the multiple columns;
the computer system repeating the determining that the given column is the identifier, auto-increment, or sequence column and the filtering out the given column until each of the remaining one or more columns is not the identifier column, the auto-increment column, or the sequence column; and
subsequent to the repeating, the computer system selecting the column from the remaining one or more columns,
wherein the determining that the column is the candidate for changing the original data type of the column is based on the column being selected from the remaining one or more columns.

18. The computer system of claim 17, wherein the method further comprises:
the computer system identifying a portion of data in the column that is null;
the computer system sampling data sizes of the data in the column without considering the identified portion of the data that is null; and
using defined policies associating a given sampled data size to a corresponding data type, the computer system identifying the multiple data types as data types corresponding to the sampled data sizes, wherein the determining the multiple costs is based on the identified multiple data types.

19. The computer system of claim 15, wherein the determining the multiple costs of processing the queries in the workload includes:
selecting a given data type from the multiple data types;
selecting a query for the workload;
determining an access path to execute the selected query for the given data type;
determining a cost of executing the selected query using the access path;
determining other costs of executing the selected query using other access paths;
determining the cost of executing the selected query is less than the other costs of executing the selected query; and
based on the cost being less than the other costs of executing the selected query, selecting the given data type as the new data type.

20. The computer system of claim 15, wherein the determining the multiple costs of processing the queries in the workload includes:
selecting a given data type from the multiple data types;
selecting a query for the workload;
determining an access path to execute the selected query for the given data type;
determining a cost of executing the selected query using the access path;
determining other costs of executing the selected query using other access paths;
determining the cost of executing the selected query is equal to the other costs of executing the selected query;
in response to the determining the cost is equal to the other costs of executing the selected query, determining the page size associated with the access path and other page sizes associated with the other access paths;
determining that the page size associated with the access path is less than the other page sizes; and
based on the page size associated with the access path being less than the other page sizes, selecting the given data type as the new data type.

* * * * *